(12) United States Patent
Murase et al.

(10) Patent No.: US 7,777,984 B2
(45) Date of Patent: Aug. 17, 2010

(54) CARTRIDGE HOLDER APPARATUS AND MAGNETIC RECORDING/REPRODUCTION APPARATUS INCLUDING SAME

(75) Inventors: Kazuhide Murase, Atsugi (JP); Kazuya Tamura, Atsugi (JP); Ryoichi Annen, Atsugi (JP); Hirofumi Asai, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 825 days.

(21) Appl. No.: 11/513,757

(22) Filed: Aug. 30, 2006

(65) Prior Publication Data

US 2007/0091502 A1 Apr. 26, 2007

(30) Foreign Application Priority Data

Oct. 25, 2005 (JP) .............................. 2005-310329

(51) Int. Cl.
*G11B 5/027* (2006.01)
(52) U.S. Cl. ...................................................... 360/85
(58) Field of Classification Search ................... None
See application file for complete search history.

(56) References Cited

U.S. PATENT DOCUMENTS

| | | | | | |
|---|---|---|---|---|---|
| 4,345,283 A | * | 8/1982 | Maryschka | .............. | 360/96.61 |
| 4,484,240 A | * | 11/1984 | Yoshida | ................... | 360/96.51 |
| 4,792,872 A | * | 12/1988 | Nakanishi et al. | ........ | 360/96.51 |
| 4,918,551 A | * | 4/1990 | Yoshida et al. | ........... | 360/96.51 |
| 5,060,094 A | * | 10/1991 | Chung et al. | ............. | 360/96.51 |
| 5,119,251 A | * | 6/1992 | Matsuda | ................... | 360/96.51 |
| 5,402,405 A | * | 3/1995 | Shiomi | ........................ | 360/94 |
| 5,493,459 A | * | 2/1996 | Shiomi | ........................ | 360/94 |
| 5,883,754 A | * | 3/1999 | Kobayashi | ............... | 360/96.51 |
| 5,920,442 A | * | 7/1999 | Kasuga et al. | ................. | 360/94 |
| 5,943,183 A | * | 8/1999 | Kobayashi | ............... | 360/96.51 |

FOREIGN PATENT DOCUMENTS

| | | |
|---|---|---|
| JP | 62273650(A) | 11/1987 |
| JP | 7210960 A | 8/1995 |

\* cited by examiner

*Primary Examiner*—David D Davis
(74) *Attorney, Agent, or Firm*—Ladas & Parry, LLP

(57) ABSTRACT

A disclosed cartridge holder apparatus includes: a cartridge supporting member having a lateral plate portion and side plate portions on both sides thereof; a cartridge upper surface supporting member disposed between the side plate portions on both sides of the cartridge supporting member; a support mechanism of a cartridge upper surface supporting member for supporting the cartridge upper surface supporting member so as to form a cartridge housing space in accordance with an inserted cartridge; and a cartridge gripping mechanism supported by the cartridge upper surface supporting member and the support mechanism of a cartridge upper surface supporting member. The cartridge gripping mechanism changes positions in the vertical direction, while a locking portion for locking a lock-receiving portion of an inserted cartridge maintains a position in a cartridge insertion direction.

7 Claims, 17 Drawing Sheets

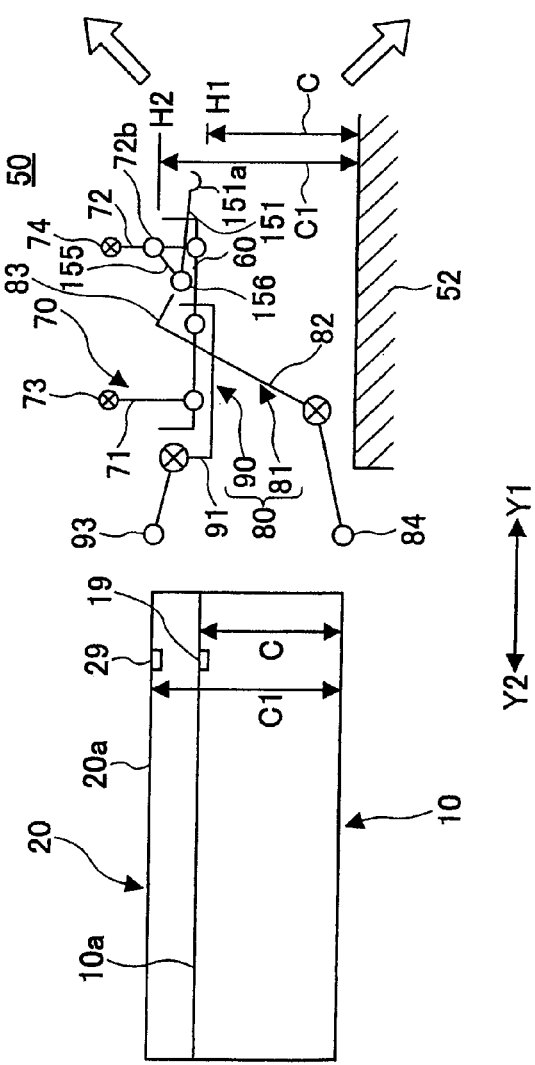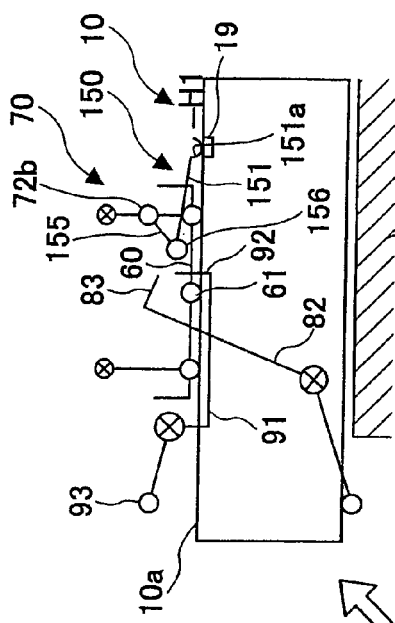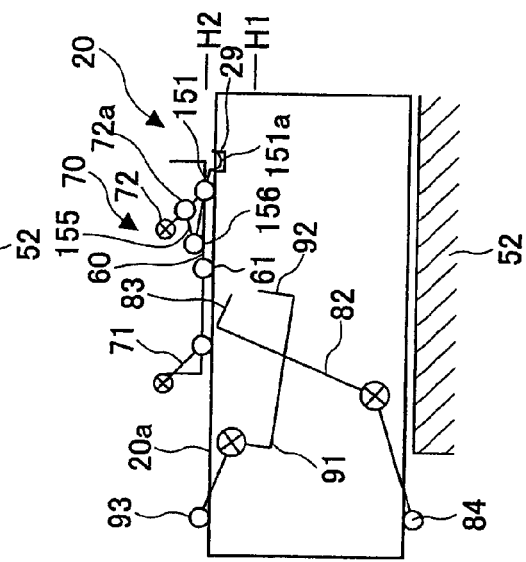

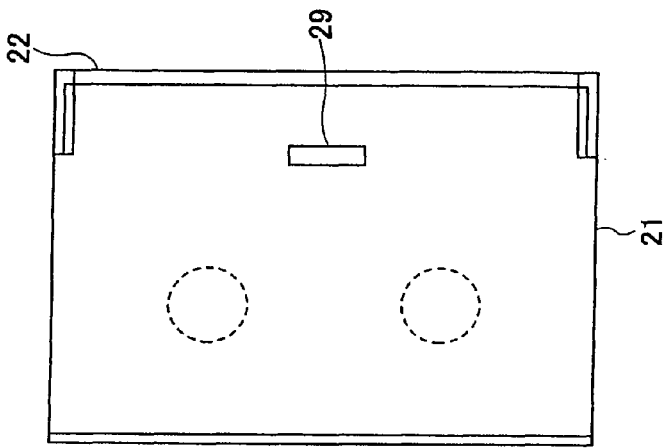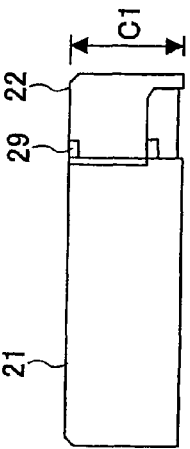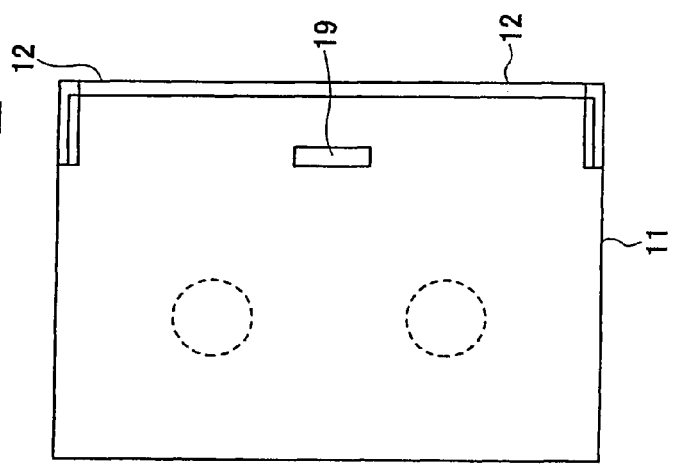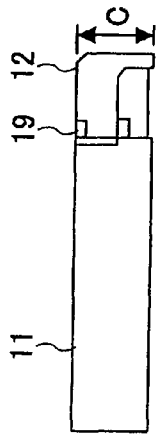

CARTRIDGE HOLDER APPARATUS AND MAGNETIC RECORDING/REPRODUCTION APPARATUS INCLUDING SAME

CROSS REFERENCE TO RELATED APPLICATION

The present application claims the benefit of Japanese Application No. 2005-310329, filed on Oct. 25, 2005, and published as JP 2007-122778, which is incorporated herein by reference in its entirety.

BACKGROUND OF THE INVENTION

1. Field of the Invention

The present invention generally relates to a cartridge holder apparatus and especially to a cartridge holder apparatus for a magnetic recording/reproducing apparatus.

2. Description of the Related Art

One type of tape streamer on the market used as an external storage apparatus for a computer includes the same rotating drum and tape loading mechanism as those of VCRs and uses a tape cartridge as a magnetic recording/reproducing apparatus.

Today, the storage capacity of a tape streamer is as much as 72 Gbytes in a compress mode, for example. However, there has been a demand for a higher storage capacity from customers, so that manufacturers have made an improvement of tape streamers.

One method for improving the storage capacity is to use a tape cartridge with a different size in order to house a magnetic tape having a tape width greater than that of a magnetic tape of an existing tape cartridge.

A magnetic recording/reproducing apparatus employing a tape cartridge includes an automatic tape cartridge installation device for moving a tape cartridge holder holding an inserted tape cartridge and automatically installing the tape cartridge.

In order to use the above-mentioned tape cartridge with a different size, the tape cartridge holder must be configured to be capable of having an existing tape cartridge and a different size tape cartridge, which are selectively inserted, and properly holding both tape cartridges.

In a tape cartridge holder of a conventional automatic tape cartridge installation device, only those tape cartridges with the same outside dimensions are inserted thereinto.

In order to use the different size tape cartridge, it is necessary to realize a tape cartridge holder capable of holding the existing tape cartridge and the different size tape cartridge, which are selectively inserted.

SUMMARY OF THE INVENTION

It is a general object of the present invention to provide an improved and useful cartridge holder apparatus in which the above-mentioned problem is eliminated.

A more specific object of the present invention is to provide a cartridge holder apparatus that is capable of gripping different types of cartridges when such cartridges are inserted to the same position.

The present invention provides a cartridge holder apparatus into which a plurality of types of cartridges having a lock-receiving portion at the same position on an upper surface thereof and different heights are selectively inserted, wherein the cartridge holder apparatus comprises a cartridge supporting member having a lateral plate portion and side plate portions on both sides thereof, and wherein the cartridge supporting member supports a bottom and side surfaces on both sides of an inserted cartridge. The cartridge holder apparatus also comprises a cartridge upper surface supporting member disposed between the side plate portions on both sides of the cartridge supporting member, wherein the cartridge upper surface supporting member demarcates a cartridge housing space in cooperation with the cartridge supporting member, and wherein the cartridge upper surface supporting member is positioned on an upper surface of the inserted cartridge so as to support the upper surface of the cartridge. The cartridge holder apparatus further comprises a support mechanism of a cartridge upper surface supporting member for supporting the cartridge upper surface supporting member so as to form a cartridge housing space in accordance with the inserted cartridge. Moreover, the cartridge holder apparatus also comprises a cartridge gripping mechanism supported by the cartridge upper surface supporting member and the support mechanism of a cartridge upper surface supporting member, wherein the cartridge gripping mechanism grips the lock-receiving portion of the inserted cartridge by locking, and wherein the cartridge gripping mechanism is configured to change positions in the vertical direction when the support mechanism of a cartridge upper surface supporting member is operated so as to cause the cartridge upper surface supporting member to change a size of the cartridge housing space while a locking portion for locking the lock-receiving portion of the inserted cartridge maintains a position in a cartridge insertion direction.

According to the present invention, it is possible to grip different types of cartridges when such cartridges are inserted to the same position.

Other objects, features and advantage of the present invention will become more apparent from the following detailed description when read in conjunction with the accompanying drawings.

BRIEF DESCRIPTION OF THE DRAWINGS

FIG. 1A is a skeleton diagram showing a tape cartridge holder apparatus in an initial status according to example 1 of the present invention;

FIG. 1B is a skeleton diagram showing a tape cartridge holder apparatus when an existing tape cartridge is inserted according to example 1 of the present invention;

FIG. 1C is a skeleton diagram showing a tape cartridge holder apparatus when a tape cartridge with a different size is inserted according to example 1 of the present invention;

FIG. 17A is a plain view of an existing tape cartridge;

FIG. 17B is a side view of an existing tape cartridge;

FIG. 17C is a plain view of a tape cartridge with a different size; and

FIG. 17D is a side view of a tape cartridge with a different size.

DETAILED DESCRIPTION OF THE PREFERRED EMBODIMENTS

In the following, embodiments of the present invention will be described with reference to the accompanying drawings.

Example 1

(Tape Streamer 30, Existing Tape Cartridge 10, and Tape Cartridge 20 with a Different Size)

Figure 16:
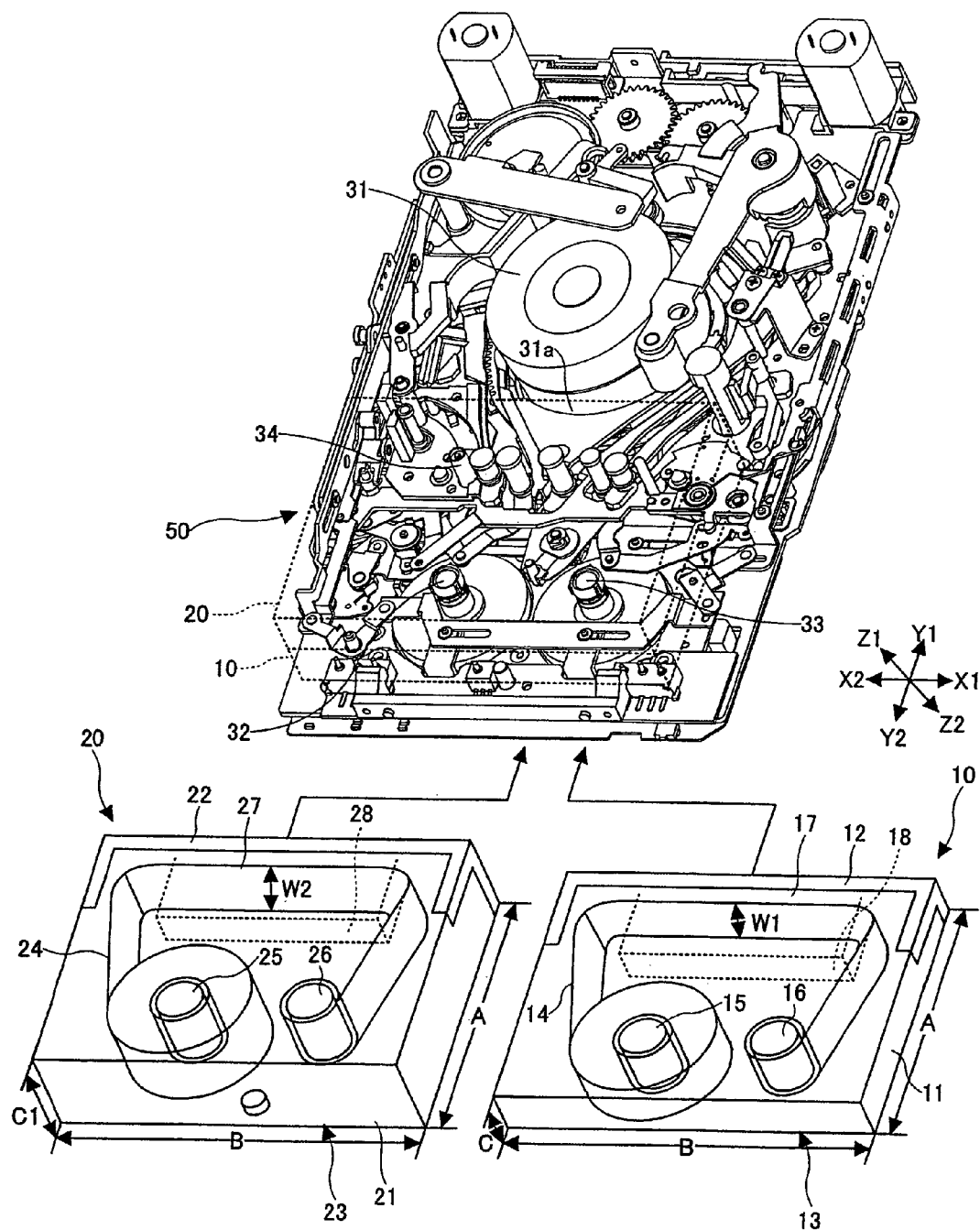
FIG. 16 is a diagram showing a tape streamer to which a tape cartridge holder in FIG. 2 is applied, an existing tape cartridge, and a tape cartridge with a different size.

The following schematically describes a tape streamer 30 to which a tape cartridge holder in example 1 of the present invention is applied, an existing tape cartridge 10, and a tape cartridge 20 with a different size with reference to FIG. 16. In FIG. 16, a double-headed arrow X1-X2 indicates a width direction, a double-headed arrow Y1-Y2 indicates a depth direction, and a double-headed arrow Z1-Z2 indicates a height direction.

The tape streamer 30 includes a rotating drum device 31, a magnetic tape loading mechanism 34 for drawing a magnetic tape from an installed tape cartridge and loading the magnetic tape in a predetermined path, reel axes 32 and 33, a tape cartridge holder 50 capable of holding the existing tape cartridge 10 as a first cartridge and the different size tape cartridge 20 as a second cartridge, and the like.

As shown in FIGS. 16 and 17, the existing tape cartridge 10 has outside dimensions of A (depth)×B (width)×C (height). In the existing tape cartridge 10, a cartridge body 13 includes a housing 11, a front cover 12, and a bottom slide plate (not shown in the drawings), in which a magnetic tape 14 with a width W1 of 4 mm is wound on a supply reel 15 and a take-up reel 16 and a tape path 17 is formed along a rear surface of the front cover 12. And a pole housing space 18 opening upon installation is formed in a front portion of a bottom of the existing tape cartridge 10. In addition, a concave portion 19 is provided as a lock-receiving portion in the vicinity of the cover 12 in a top plate of the housing 11. The concave portion 19 is a portion into which a convex portion of a leaf spring for gripping a cartridge holder is fitted as will be described in the following.

As shown in FIGS. 16 and 17, the different size tape cartridge 20 has outside dimensions of A (depth)×B (width)×C1 (height). In the different size tape cartridge 20, a cartridge body 23 includes a housing 21, a front cover 22, and a bottom slide plate (not shown in the drawings), in which a magnetic tape 24 with a width W2 of 8 mm is wound on a supply reel 25 and a take-up reel 26 and a tape path 27 is formed along a rear surface of the front cover 22. And a pole housing space 28 opening upon installation is formed in a front portion of a bottom of the different size tape cartridge 20. The height A and width B of the different size tape cartridge 20 are the same as those of the existing tape cartridge 10, and the height C1 of the different size tape cartridge 20 is about 1.5 times the height C of the existing tape cartridge 10.

The different size tape cartridge 20 also includes a concave portion 29 formed on a top plate of the housing 21. A position of the concave portion 29 corresponds to the position of the above-mentioned concave portion 19.

[Tape Cartridge Holder Apparatus 50]

FIG. 1A is a skeleton diagram showing the tape cartridge holder apparatus 50 according to example 1 of the present invention. FIG. 1B is a skeleton diagram showing the tape cartridge holder apparatus 50 when the existing tape cartridge 10 is inserted. And FIG. 1C is a skeleton diagram showing the tape cartridge holder apparatus 50 when the different size tape cartridge 20 is inserted.

Figure 2:
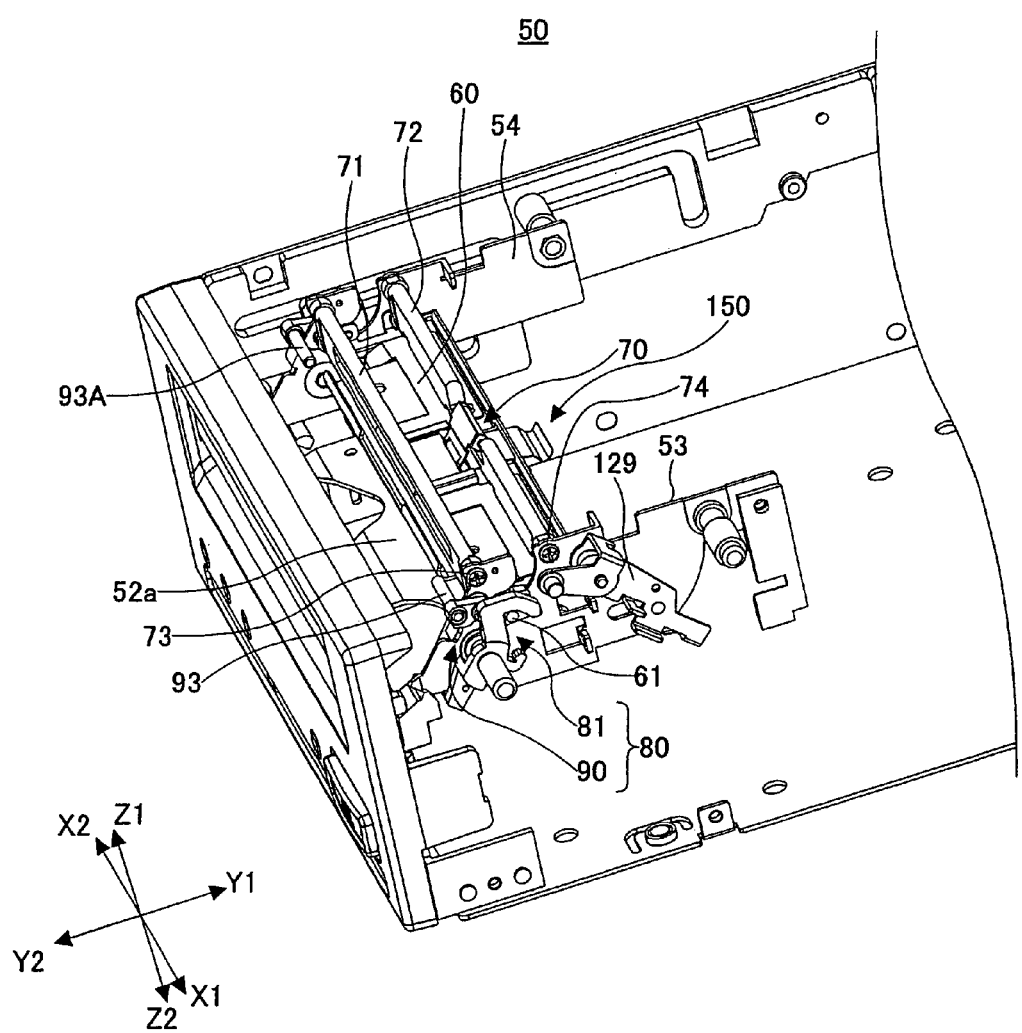
FIG. 2 is a perspective view showing a tape cartridge holder apparatus according to example 1 of the present invention.
Figure 3:
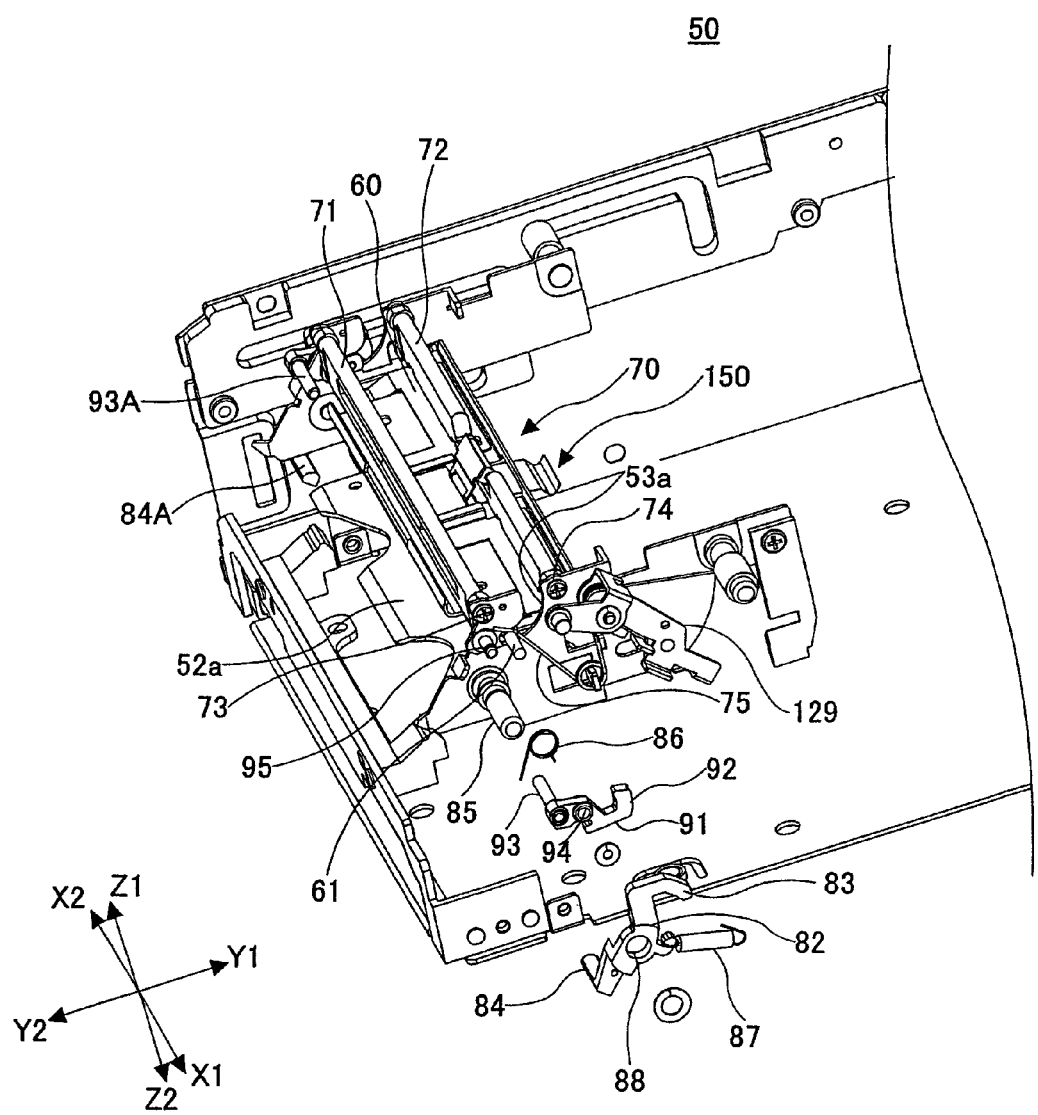
FIG. 3 is a perspective view showing a tape cartridge holder apparatus when a first lock lever and a second lock lever are disassembled.
Figure 4:
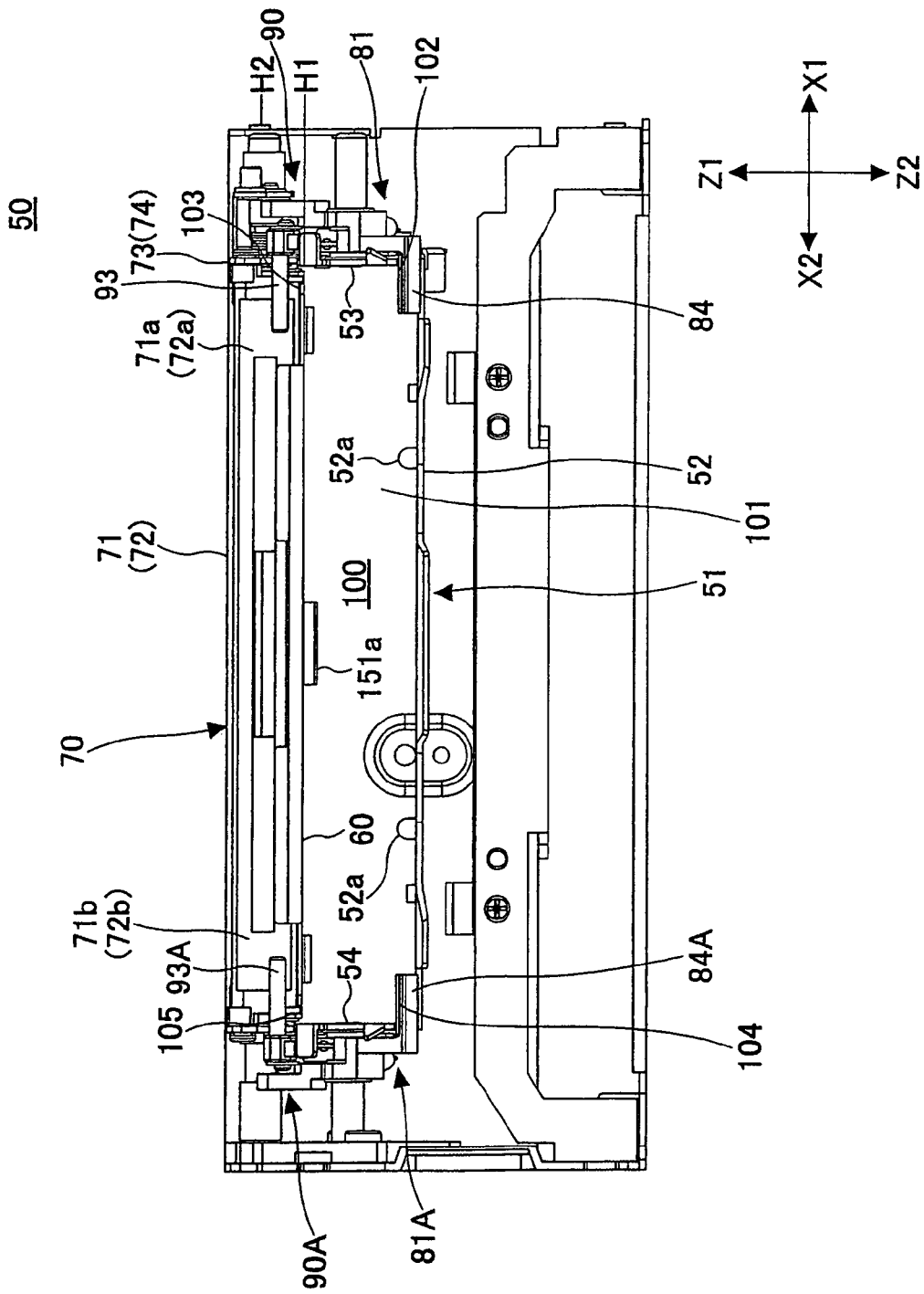
FIG. 4 is a front view of a tape cartridge holder apparatus.
Figure 5:
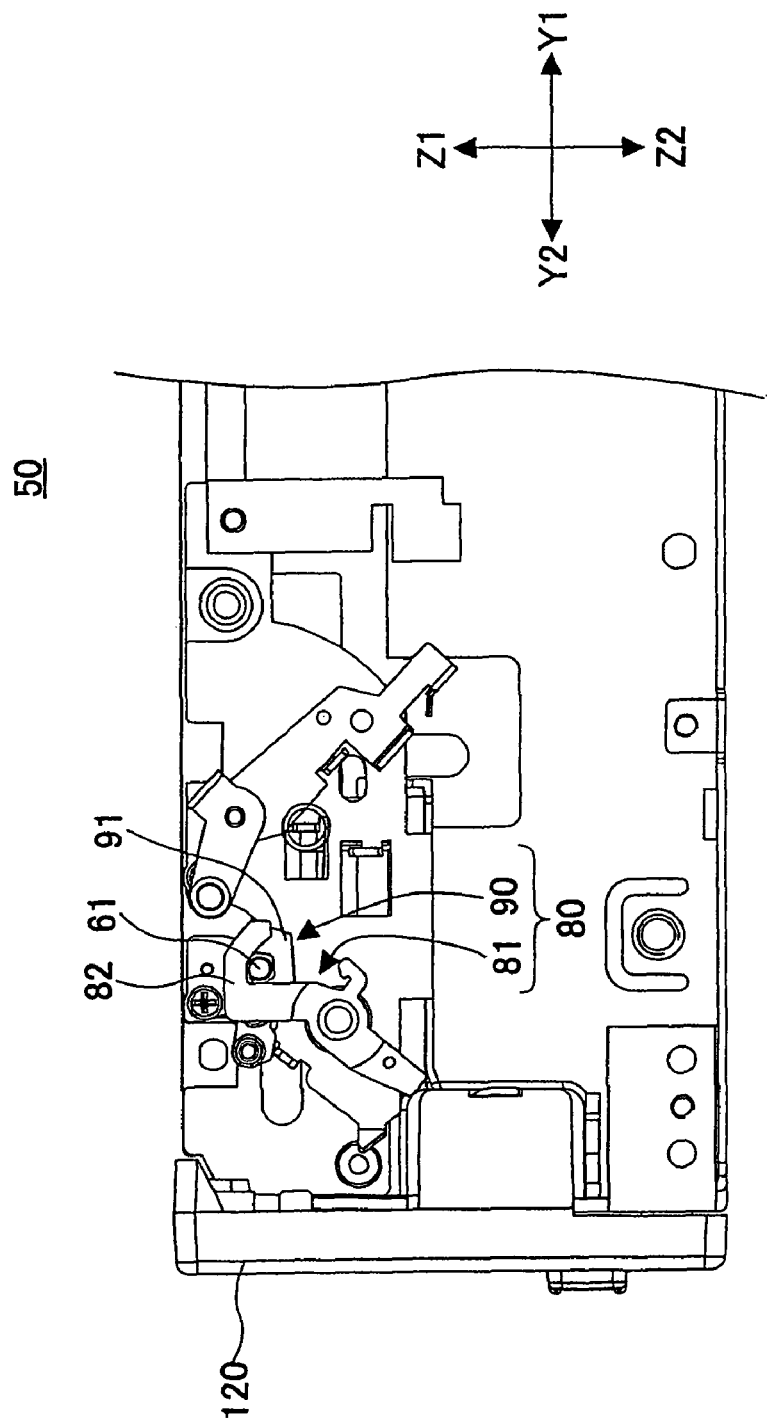
FIG. 5 is a side view of a tape cartridge holder apparatus.
Figure 6:
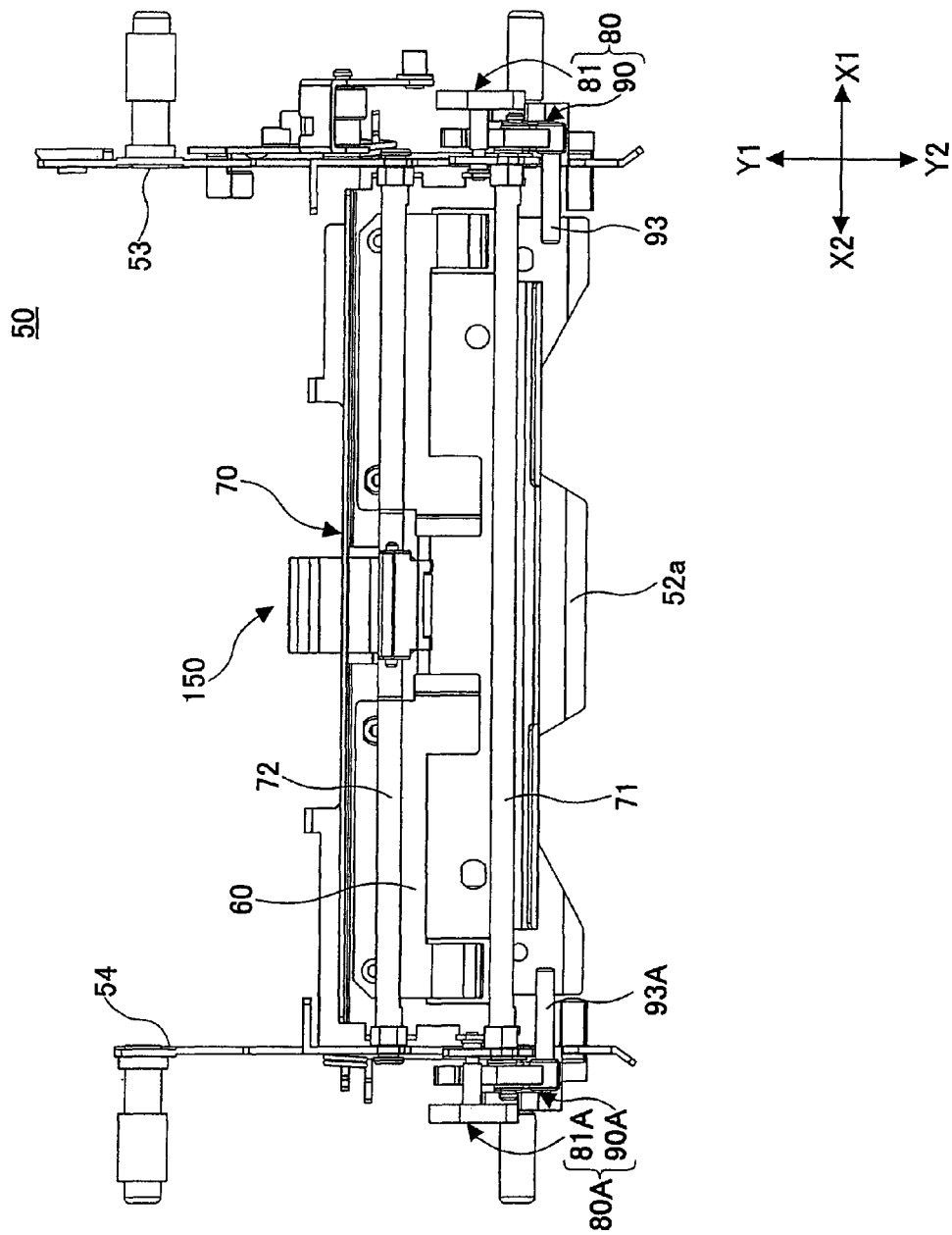
FIG. 6 is a plan view of a tape cartridge holder apparatus.
Figure 7:
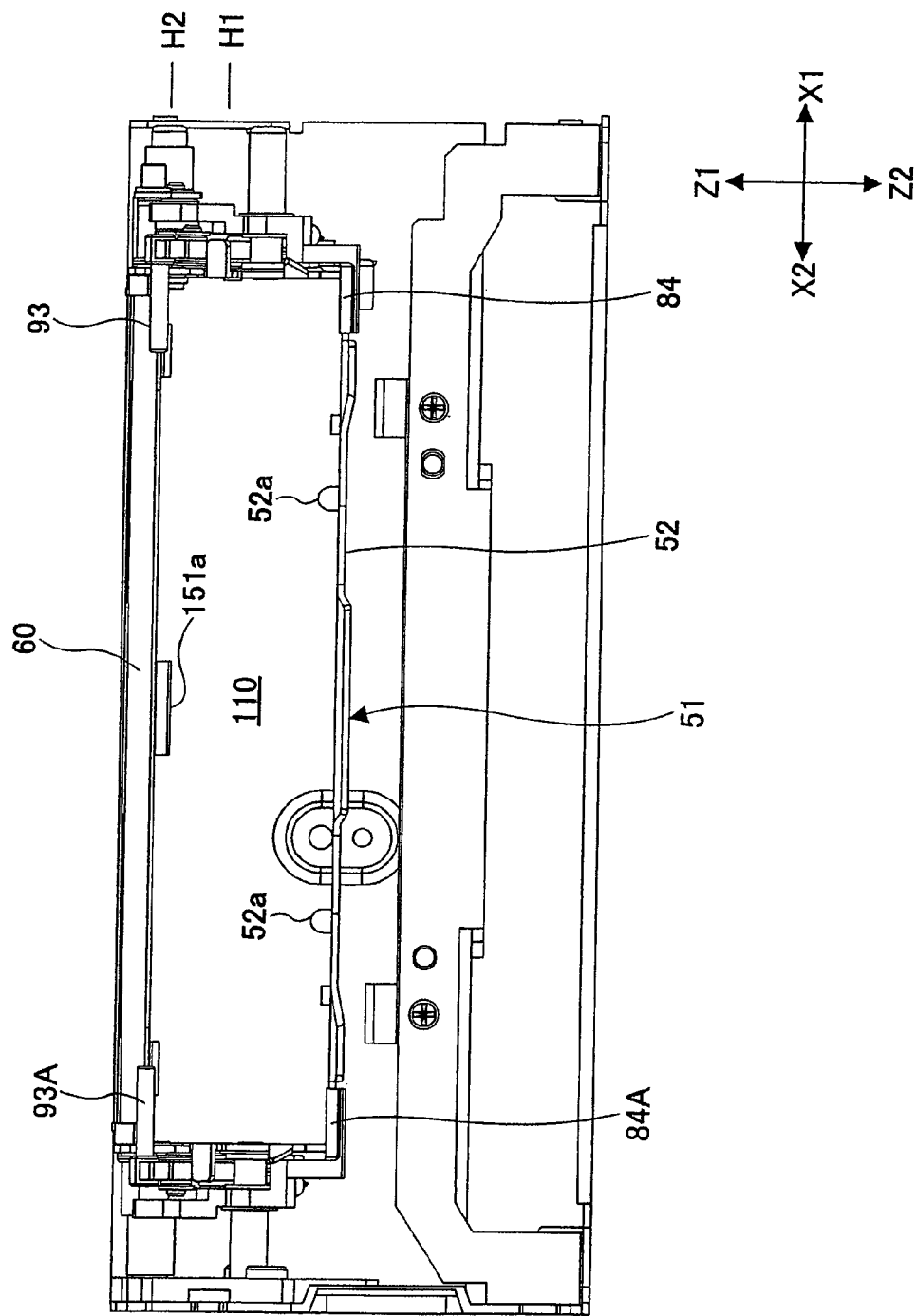
FIG. 7 is a front view of a tape cartridge holder apparatus when a housing space for a tape cartridge is expanded.
Figure 8:
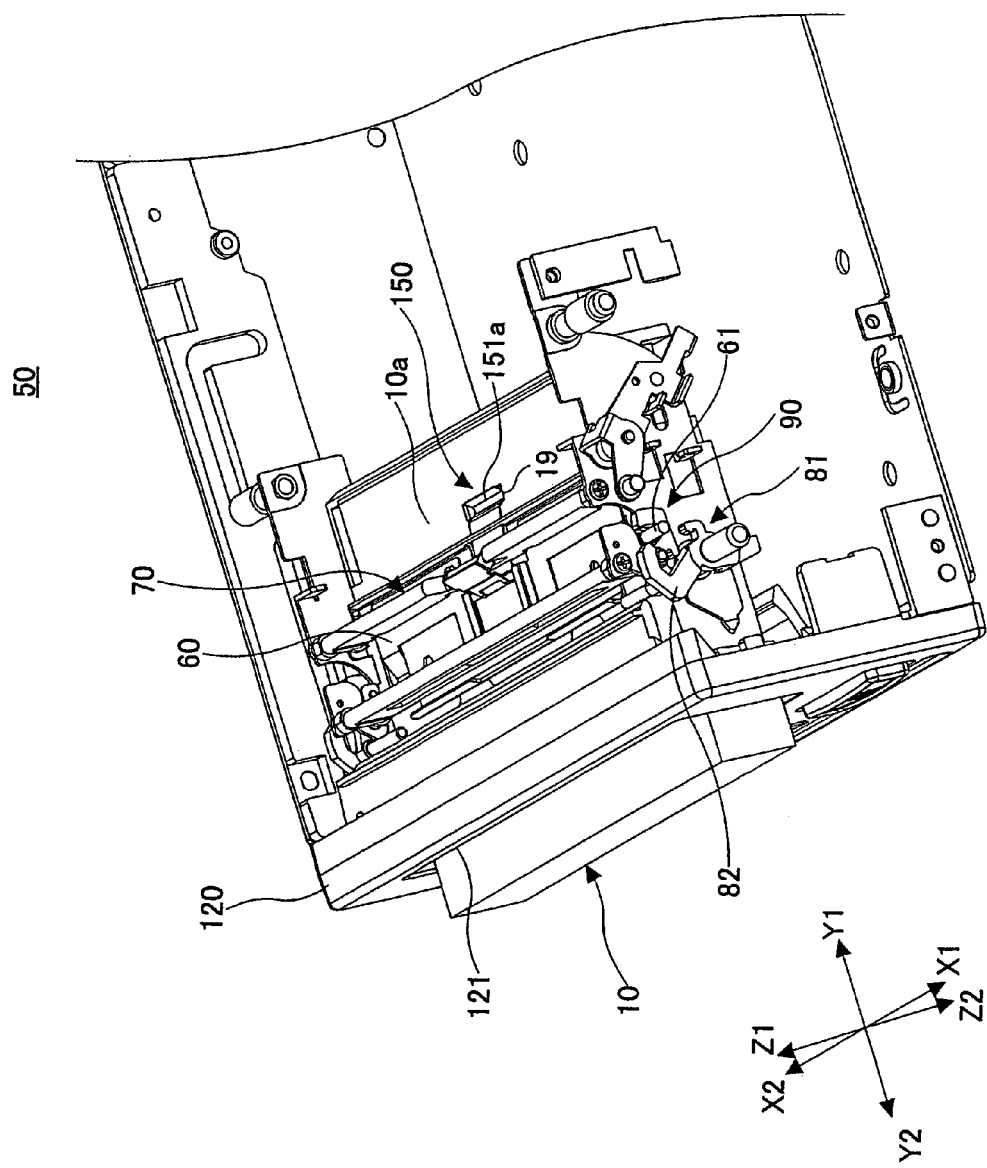
FIG. 8 is a perspective view showing a tape cartridge holder apparatus when an existing tape cartridge is inserted and held.

FIG. 2 is a perspective view showing the tape cartridge holder apparatus 50 in an initial status. FIG. 3 is a perspective view showing the tape cartridge holder apparatus 50 when first and second locking members 82 and 91 in FIG. 2 are disassembled. FIG. 4 is a front view of the tape cartridge holder apparatus 50 in an initial status. FIG. 5 is a side view of the tape cartridge holder apparatus 50 when the first and second locking members 82 and 91 in FIG. 4 are disassembled. FIG. 6 is a plan view of the tape cartridge holder apparatus 50 in the initial status. FIG. 7 is a front view of the tape cartridge holder apparatus 50 in the initial status.

The tape cartridge holder apparatus 50 has the same mechanism in an X1 side and an X2 side, and description in the following is mainly based on the mechanism on the X1 side.

As shown in each drawing, the tape cartridge holder apparatus 50 includes a cartridge supporting member 51, a cartridge upper surface supporting member 60, a support mechanism 70 of a cartridge upper surface supporting member, a double locking mechanism 80, and a tape cartridge gripping mechanism 150. The double locking mechanism 80 includes a first locking mechanism 81 and a second locking mechanism 90.

The cartridge supporting member 51 is U-shaped when viewed from the Y2 side and includes a lateral plate portion 52 and side plate portions 53 and 54 disposed on both sides thereof. The lateral plate portion 52 includes a projecting portion 52a projecting to the Y2 side.

The support mechanism 70 of a cartridge upper surface supporting member includes first and second suspension members 71 and 72 placed laterally between the side plate portions 53 and 54, both ends of the first and second suspension members 71 and 72 being rotatably supported by the side plate portions 53 and 54. Numeral 73 designates a pivotal support of the first suspension member 71 and numeral 74 designates a pivotal support of the second suspension member 72. The first suspension member 71 is inverted U-shaped when viewed from the Y2 side and includes arm portions 71a and 71b extending in the Z2 direction on the X1 and X2 sides. The second suspension member 72 is also inverted U-shaped when viewed from the Y2 side in the same manner as in the first suspension member 71, and includes arm portions 72a and 72b extending in the Z2 direction on the X1 and X2 sides. The arm portions 71a, 71b, 72a, and 72b are disposed on positions corresponding to each corner of a rectangle when viewed from the Z1 side.

The cartridge upper surface supporting member 60 is made of a rectangular plate and is disposed between the side plate portions 53 and 54, in which the vicinity of each corner of the plate is rotatably connected to ends of the arm portions 71a, 71b, 72a, and 72b and supported. The cartridge upper surface supporting member 60 demarcates a cartridge housing space in association with the cartridge supporting member 51. Also, the cartridge upper surface supporting member 60 is positioned on an upper surface of an inserted cartridge and supports the upper surface of the cartridge.

In accordance with this, the cartridge upper surface supporting member 60 swings and moves between an initial height H1 as shown in FIG. 1A and a height H2 after movement as shown in FIG. 1B when the first and second suspension members 71 and 72 are rotated in a pendulum manner. The initial height H1 corresponds to a height of the existing tape cartridge 10 and the height H2 after movement corresponds to a height of the different size tape cartridge 20.

In the initial status, as shown in FIG. 4, an existing tape cartridge housing space 100 for the existing tape cartridge 10 is demarcated by the cartridge supporting member 51 and the cartridge upper surface supporting member 60. The existing tape cartridge housing space 100 includes a rectangular inlet portion 101 on the Y2 side. The inlet portion 101 has four corners, namely, a corner 102 (X1-Z2), corner 103 (X1-Z1), corner 104 (X2-Z2), and corner 105 (X2-Z1).

As shown in FIG. 7, when the cartridge upper surface supporting member 60 is moved to the height H2 after movement, the existing tape cartridge housing space 100 is expanded in the Z1 direction and a different size tape cartridge housing space 110 for the different size tape cartridge 20 is demarcated.

As shown in FIG. 3, the cartridge upper surface supporting member 60 includes a lock pin 61 at an end in the X1 side. The lock pin 61 extends through a long recess 53a of the side plate portion 53 and pierces the side plate portion 53 to the X1 side thereof. The lock pin 61 is biased in the Y2 direction by an arm portion of a torsion coil spring member 75 installed in the side plate portion 53.

As shown in FIG. 3, the first locking mechanism 81 includes a first lock lever 82. The first lock lever 82 includes a hook portion 83 at one end and a cartridge detecting pin 84 at the other end. In the first lock lever 82, an aperture 88 in a substantially central portion thereof is fitted into a shaft 85 on the side plate portion 53. The first lock lever 82 is biased in the clockwise direction by a spring member 87 and the hook portion 83 is locked on the lock pin 61 from the Z1 side. As shown in FIG. 4, the cartridge detecting pin 84 is disposed at the corner 102 (X1-Z2) of the inlet portion 101 on the Y2 side of the existing tape cartridge housing space 100 and the cartridge detecting pin 84 extends in the X2 direction.

As also shown in FIG. 3, the second locking mechanism 90 includes a second lock lever 91. The second lock lever 91 includes a hook portion 92 at one end and a cartridge detecting pin 93 at the other end. In the second lock lever 91, an aperture 94 in a substantially central portion thereof is fitted into a shaft 95 on the side plate portion 53. The second lock lever 91 is biased in the counterclockwise direction by a spring member 86 and the hook portion 92 is locked on the lock pin 61 from the Z2 side. As shown in FIG. 4, the cartridge detecting pin 93 is disposed at the corner 103 (X1-Z1) of the inlet portion 101 of the existing tape cartridge housing space 100 and the cartridge detecting pin 93 extends in the X2 direction.

As shown in FIG. 4, a first locking mechanism 81A and a second locking mechanism 90A are disposed on the X2 side of the tape cartridge holder apparatus 50. A cartridge detecting pin 84A is disposed at the corner 104 (X2-Z2) and a cartridge detecting pin 93A is disposed at the corner 105 (X2-Z1) of the inlet portion 101 of the existing tape cartridge housing space 100.

In the initial status, the cartridge upper surface supporting member 60 is double-locked on both X1 and X2 sides.

[Tape Cartridge Gripping Mechanism 150]

Figure 12:
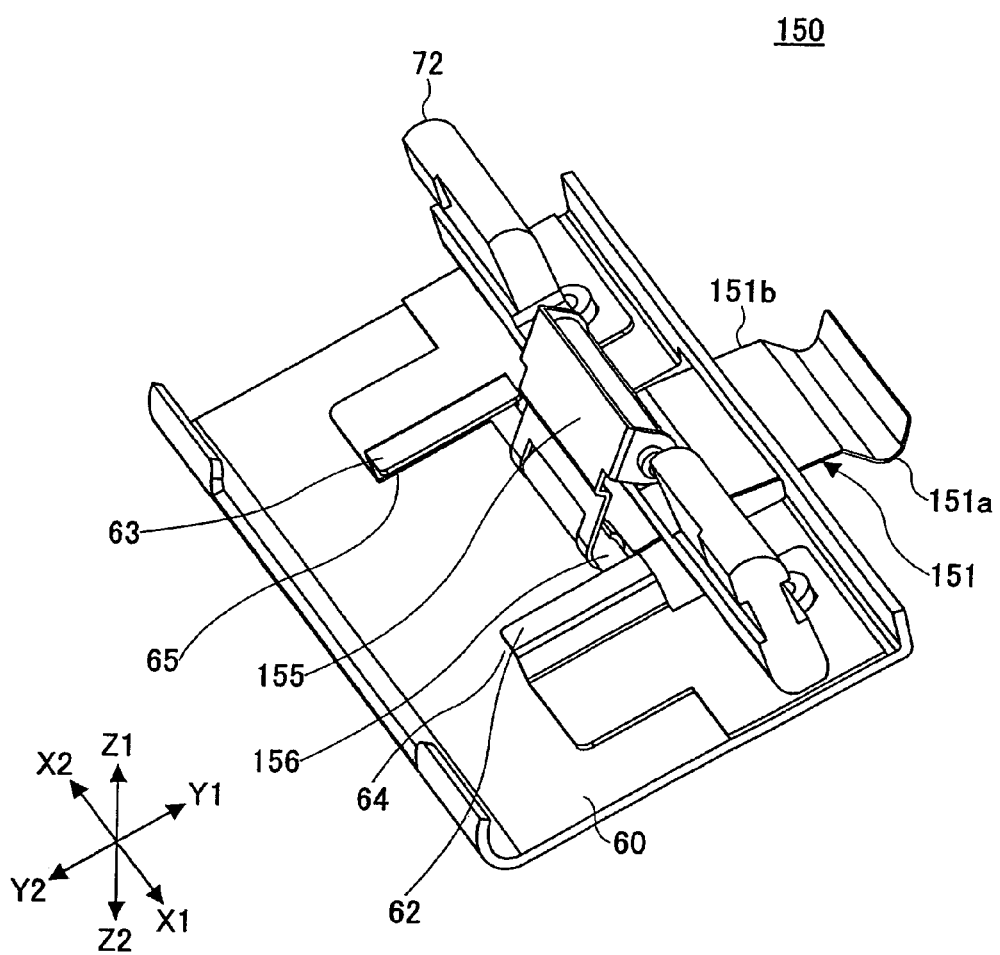
FIG. 12 is an enlarged perspective view showing a tape cartridge gripping mechanism.
Figure 13:
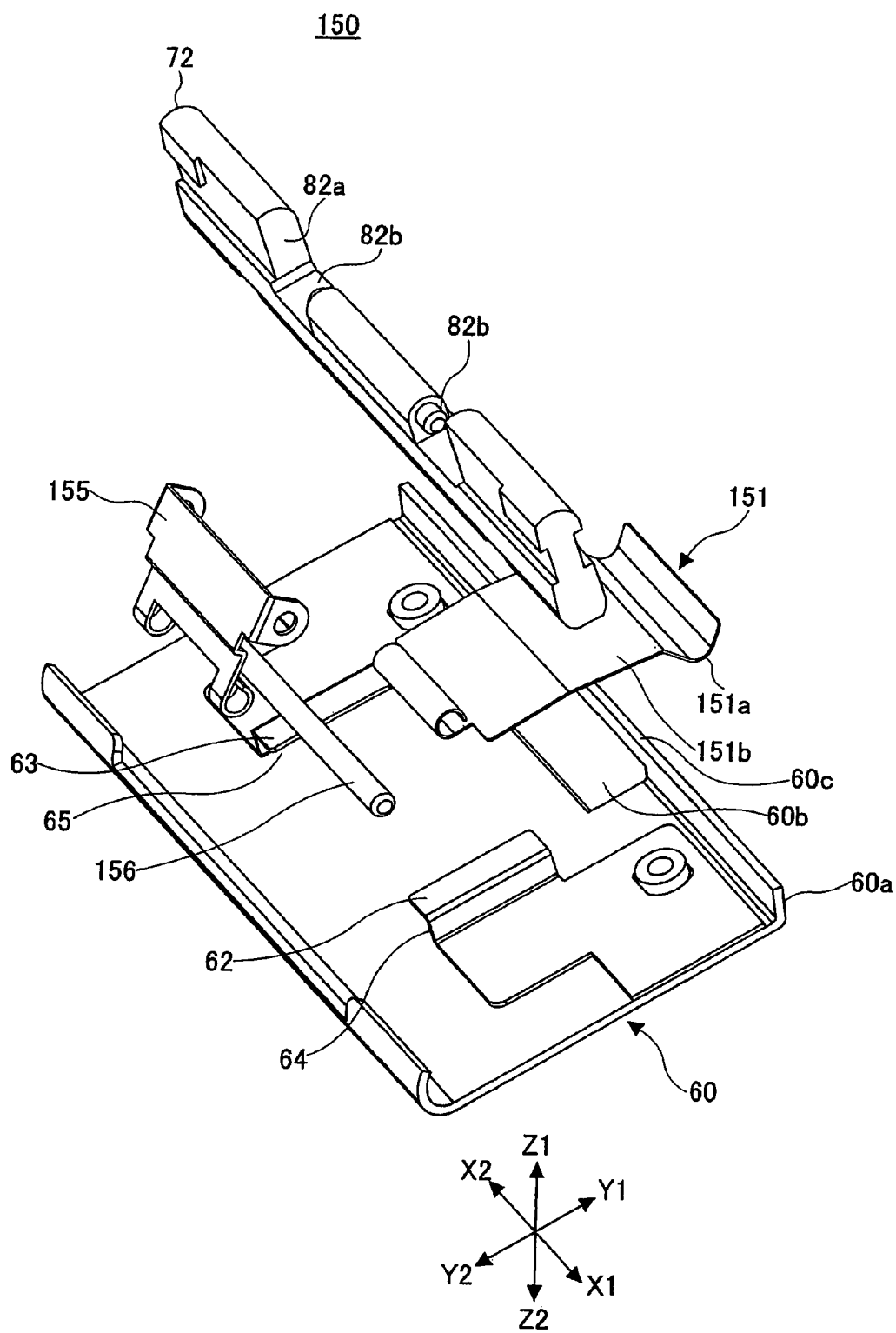
FIG. 13 is an exploded and enlarged perspective view showing a tape cartridge gripping mechanism.
Figure 14A:
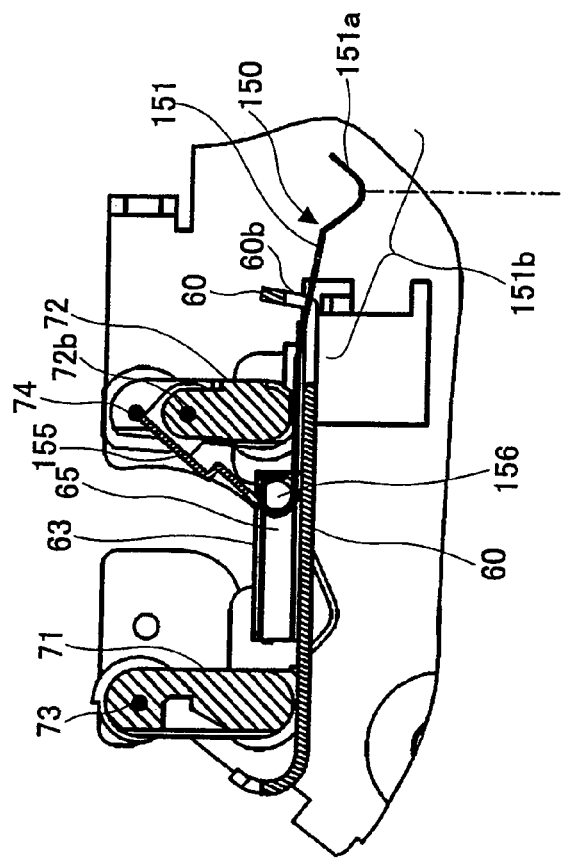
FIG. 14A is an enlarged side view of a tape cartridge gripping mechanism and a support mechanism for a cartridge upper surface supporting member in an initial status.
Figure 14B:
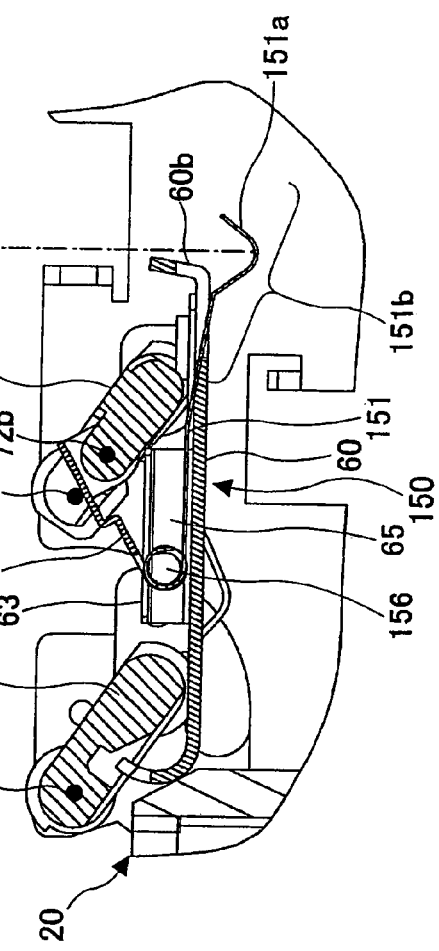
FIG. 14B is an enlarged side view of a tape cartridge gripping mechanism and a support mechanism for a cartridge upper surface supporting member in operation.

FIG. 12 is an enlarged perspective view showing the tape cartridge gripping mechanism 150. FIG. 13 is an exploded and enlarged perspective view showing the tape cartridge gripping mechanism 150. FIG. 14A is an enlarged side view of the tape cartridge gripping mechanism 150 and the support mechanism 70 of a cartridge upper surface supporting member in the initial status. FIG. 14B is an enlarged side view of the tape cartridge gripping mechanism 150 and the support mechanism 70 of a cartridge upper surface supporting member in operation.

The tape cartridge gripping mechanism 150 is used for fitting into the concave portion 19 of the existing tape cartridge 10 inserted into a predetermined position so as to hold the existing tape cartridge 10 inside the tape cartridge holder apparatus 50. The tape cartridge gripping mechanism 150 is also used for fitting into the concave portion 29 of the different size tape cartridge 20 inserted into the predetermined position so as to hold the different size tape cartridge 20 inside the tape cartridge holder apparatus 50.

The tape cartridge gripping mechanism 150 includes a cartridge gripping member 151 and a link, member 155 and uses portions of the support mechanism 70 of a cartridge upper surface supporting member and the cartridge upper surface supporting member 60.

As shown in FIG. 13, the second suspension member 72 has a slit portion 82a in a central portion thereof and a pin 82b protruding in the slit portion 82a in the X1-X2 direction.

The cartridge upper surface supporting member 60 has a rising rib portion 60a on the Y1 side and a slit 60b extending from a bottom the rising rib portion 60a in the Y2 direction. A size of the slit 60b is determined such that a span portion 151b flexibly disposed in the Z1 direction is not interfered therewith. Reference numeral 60c designates a bridge portion. The bridge portion 60c is a portion of the rising rib portion 60a and is positioned above the slit 60b.

The cartridge gripping member 151 includes a rectangular leaf spring member and has convex portion 151a at an end thereof in the Y1 direction as a locking portion convex in the Z2 direction. The convex portion 151a is a portion fitted into the concave portions 19 and 29. The cartridge gripping member 151 is placed on the cartridge upper surface supporting member 60 and is positioned below the second suspension member 72. The cartridge gripping member 151 in the Y1 side passes through the slit 60b and the convex portion 151a is positioned on the Y1 side relative to the cartridge upper surface supporting member 60. The span portion 151b is a portion of the cartridge gripping member 151 extending in the Y1 direction relative to the second suspension member 72, the span portion 151b being elastically flexible. The span portion 151b is positioned in an obliquely downward direction and the convex portion 151a is positioned on the Z2 side relative to a lower surface of the cartridge upper surface supporting member 60. When the position of the convex portion 151a is changed in the Z1 direction, the cartridge gripping member 151 is locked and constrained by the bridge portion 60c and the span portion 151b is made to be elastically flexible.

The link member 155 is rotatably supported on an upper end thereof by the pin 82b in the slit portion 82a at the central portion of the second suspension member 72. In addition, the link member 155 extends in a direction between Z2 and Y2 (obliquely downward direction of a direction opposite to a direction of cartridge insertion). Tips of the link member 155 are rotatably connected to the cartridge gripping member 151 on the Y2 side using a connection pin 156.

On the cartridge upper surface supporting member 60, guide rail members 62 and 63 are fixed and guide rails 64 and 65 are formed. Both ends of the connection pin 156 are movably engaged with the guide rails 64 and 65 in the Y1-Y2 direction. Thus, rising of the end of the cartridge gripping member 151 in the Y2 direction is limited by the cartridge upper surface supporting member 60.

Figure 15A:
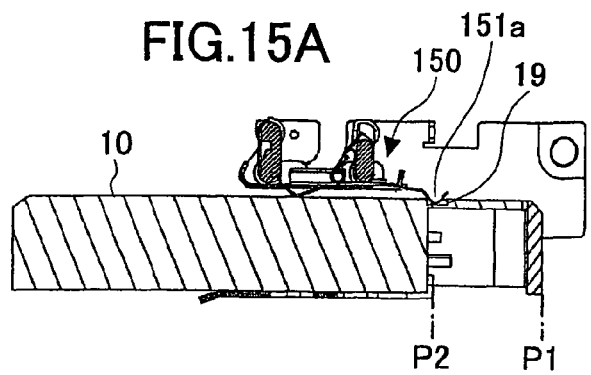
FIG. 15A is a side view of a tape cartridge gripping mechanism and a support mechanism for a cartridge upper surface supporting member when an existing tape cartridge is inserted and held.
Figure 15B:
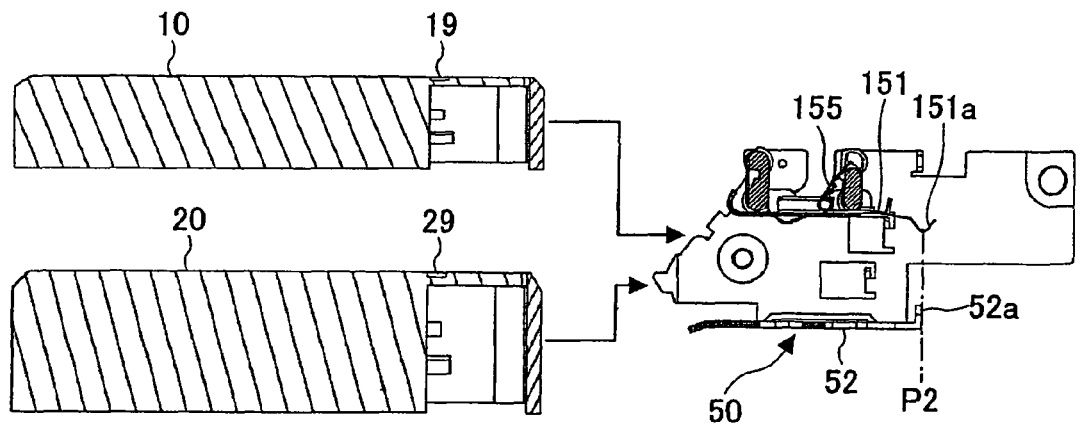
FIG. 15B is a side view of a tape cartridge gripping mechanism and a support mechanism for a cartridge upper surface supporting member in an initial status.

As shown in FIG. 15A, when the existing tape cartridge 10 is inserted to an end position P1, the convex portion 151a is positioned at a position P2 facing the concave portion 19.

[Insertion, Installation, and Ejection of the Existing Tape Cartridge 10]

An operator holds a back of the existing tape cartridge 10 and inserts a tip of the existing tape cartridge 10 into an insertion opening of a front panel.

The tip of the existing tape cartridge 10 pushes flaps 125 and 126 to open and slides on the projecting portion 52a of the lateral plate portion 52. The tip of the existing tape cartridge 10 passes through the inlet portion 101 from the Y2 side and is inserted into the existing tape cartridge housing space 100 to the end position P1 determined in advance such that an end of the housing 11 is brought into contact with the rising lug 52a of the lateral plate portion 52 of the cartridge supporting member 51 on the Y1 side. As shown in FIGS. 1B, 8, 9, and 15A, the existing tape cartridge 10 is supported by the lateral plate portion 52, both ends thereof are regulated by the side plate portions 53 and 54, and an upper surface 10a thereof is supported by the cartridge upper surface supporting member 60.

When the existing tape cartridge 10 passes through the inlet portion 101, the lower surface of the existing tape cartridge 10 presses down the cartridge detecting pins 84 and 84A in the Z2 direction. In this case, the first lock lever 82 is rotated in the counterclockwise direction, the hook portion 83 is unlocked from the lock pin 61, and the lock of the first locking mechanism 81 is released. However, the lock of the second locking mechanism 90 is maintained and the cartridge upper surface supporting member 60 is fixed at the initial position. Thus, the existing tape cartridge 10 is appropriately inserted into the tape cartridge holder apparatus 50 and appropriately housed and held in the existing tape cartridge housing space 100.

The tape cartridge gripping mechanism 150 operates as follows.

In the end stage of the insertion of the existing tape cartridge 10, the existing tape cartridge 10 presses up the convex portion 151a in the Z1 direction and makes the span portion 151b flexible. As shown in FIGS. 1B, 8, 9, and 15A, when the existing tape cartridge 10 is inserted to the end position P1, the convex portion 151a is fitted into the concave portion 19 due to spring force of the span portion 151b and grips the existing tape cartridge 10.

Next, an automatic installation device of a tape cartridge (not shown in the drawings) is operated and the tape cartridge holder apparatus 50 is moved to a predetermined position. Then, as shown in dashed lines in FIG. 9, the existing tape cartridge 10 is moved to a predetermined position along with the tape cartridge holder apparatus 50 and then installed on the tape streamer 30. In this step, the front cover 12 is opened by a front cover opening lever 129.

Figure 9:
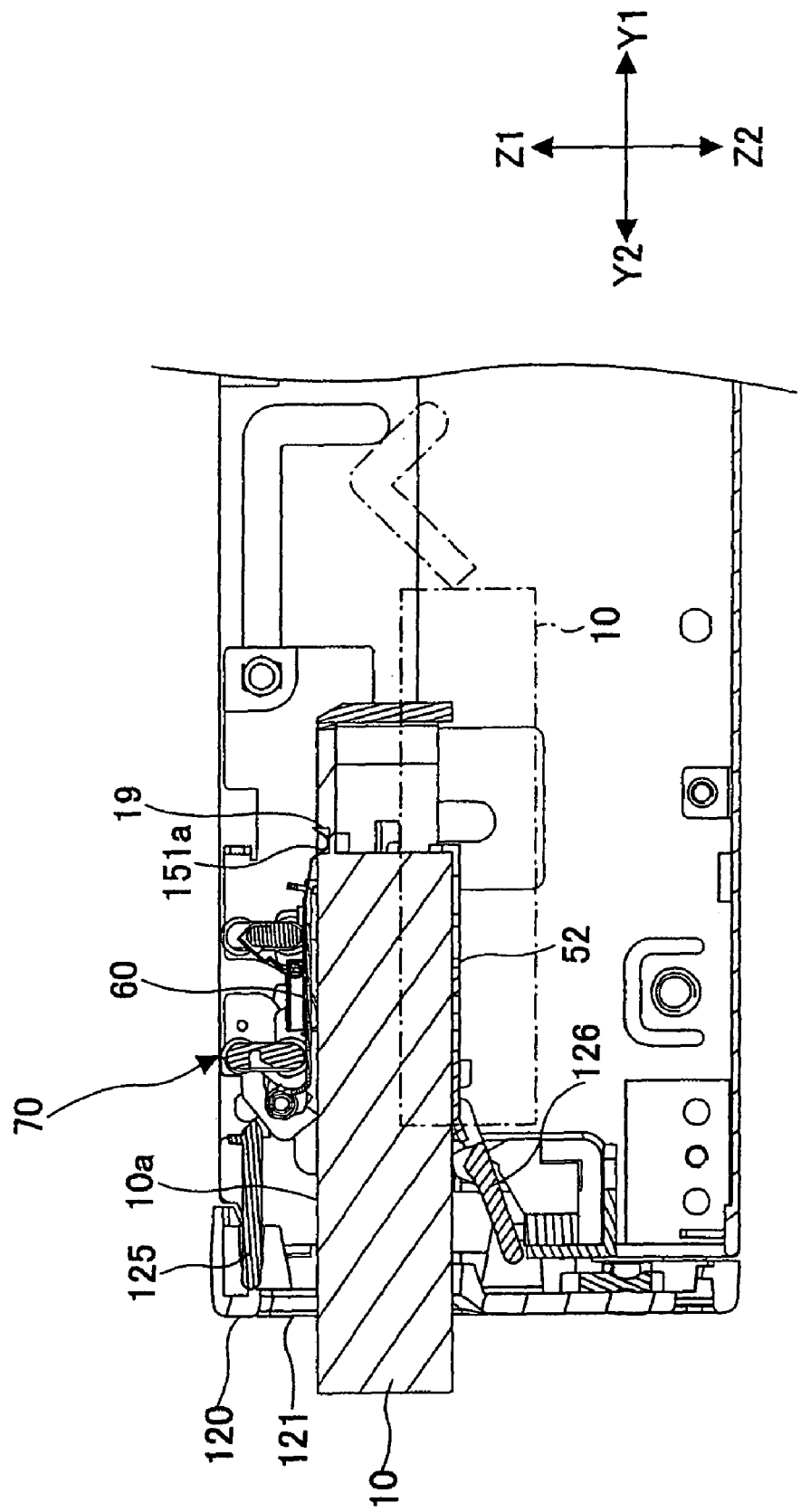
FIG. 9 is a side view of a tape cartridge holder apparatus when an existing tape cartridge is inserted and held.

When an ejection command is transmitted, the automatic installation device of a tape cartridge (not shown in the drawings) is operated in the reverse direction of the above-mentioned description, and the installed existing tape cartridge 10 is ejected along with the tape cartridge holder apparatus 50 to a position shown in FIG. 9. Thereafter, when the operator withdraws a portion of the existing tape cartridge 10 protruding from the tape streamer 30, the existing tape cartridge 10 is taken out of the tape streamer 30.

The tape cartridge gripping mechanism 150 grips the existing tape cartridge 10, so that the existing tape cartridge 10 is moved along with the tape cartridge holder apparatus 50 when the automatic installation device of a tape cartridge is operated.

[Insertion, Installation, and Ejection of the Different Size Tape Cartridge 20]

The operator holds a back of the different size tape cartridge 20 and inserts a tip of the different size tape cartridge 20 into an insertion opening of a front panel.

The tip of the different size tape cartridge 20 pushes the flaps 125 and 126 to open and slides on the projecting portion 52a of the lateral plate portion 52 in the Y1 direction. In this case, a lower surface of the different size tape cartridge 20 presses down the cartridge detecting pin 84 and 84A in the Z2 direction and an upper surface thereof presses up the detection pins 93 and 93A in the Z1 direction. Accordingly, the first lock lever 82 is rotated in the counterclockwise direction and the second lock lever 91 is rotated in the clockwise direction. In addition, the hook portions 83 and 92 are unlocked from the lock pin 61 and locks of the first locking mechanism 81 and the second locking mechanism 90 are released, so that the cartridge upper surface supporting member 60 is movable in the Y1 direction.

Figure 10:
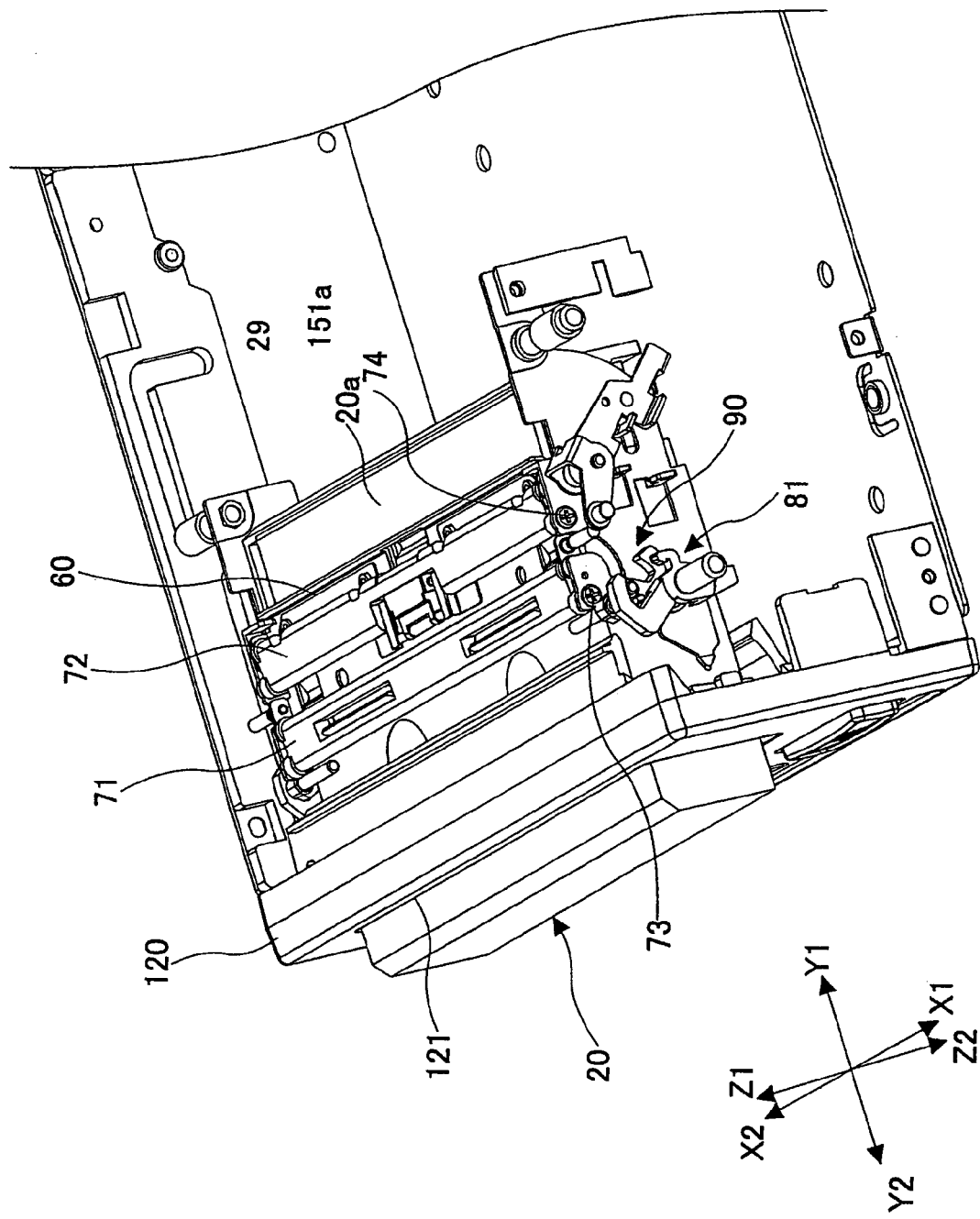
FIG. 10 is a perspective view showing a tape cartridge holder apparatus when a tape cartridge with a different size is inserted and held.
Figure 11:
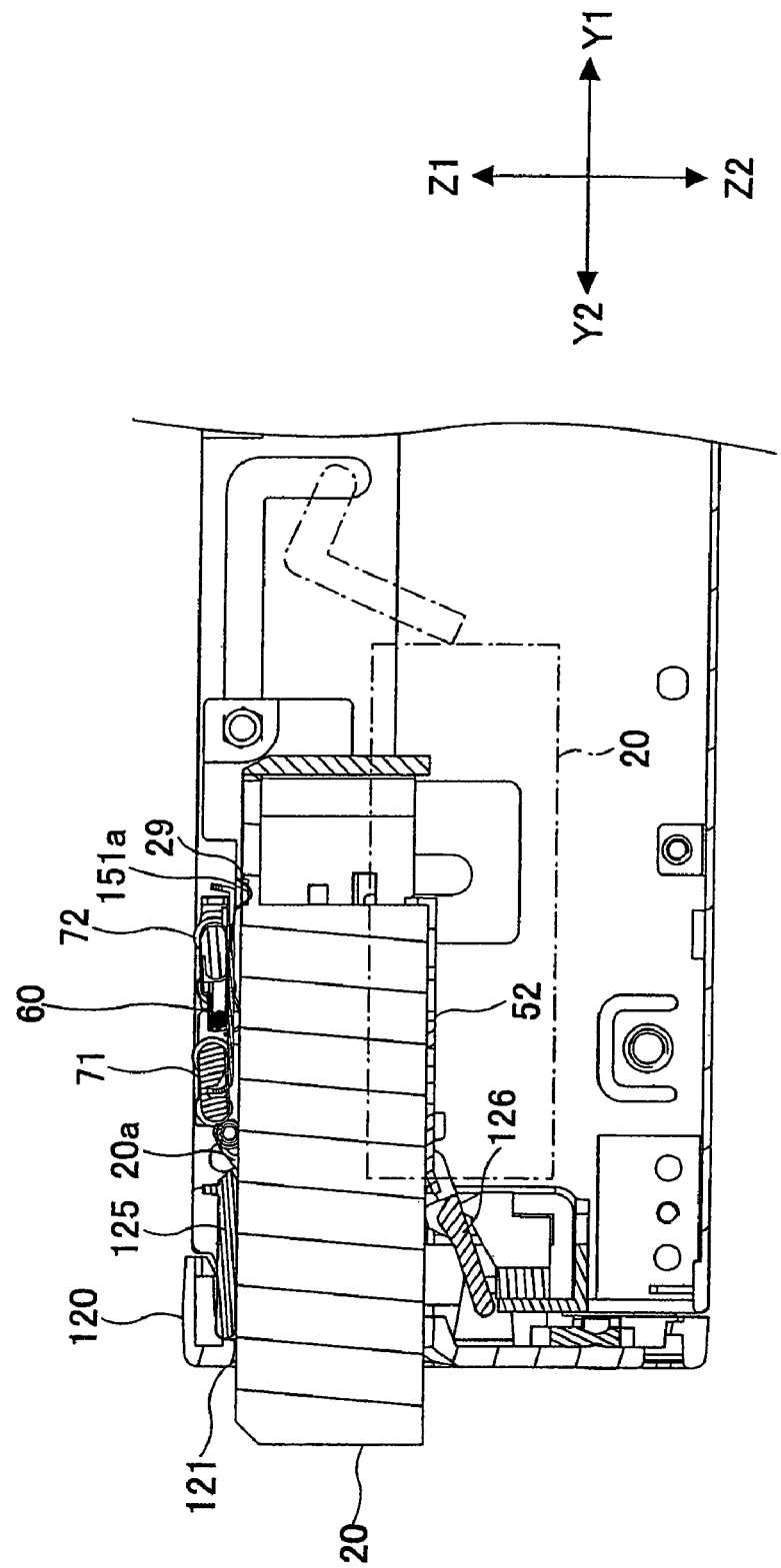
FIG. 11 is a side view of a tape cartridge holder apparatus when a tape cartridge with a different size is inserted and held.

A tip surface, an upper surface, and corners of the different size tape cartridge 20 are brought into contact with an end of the cartridge upper surface supporting member 60 on the Y2 side. The cartridge upper surface supporting member 60 is pressed and moved by the different size tape cartridge 20 in the Y1 direction. The cartridge upper surface supporting member 60 swings and moves in a direction substantially between the Y1 and Z1 directions while being supported by the first and second suspension members 71 and 72 rotating in a pendulum manner. When the position of the cartridge upper surface supporting member 60 is higher than that of an upper surface of the different size tape cartridge 20, the different size tape cartridge 20 is disposed below the lower surface of the cartridge upper surface supporting member 60 and is inserted into the different size tape cartridge housing space 110. As shown in FIGS. 1C, 10, and 11, the different size tape cartridge 20 is supported by the lateral plate portion 52, both ends thereof are regulated by the side plate portions 53 and 54, and an upper surface 20a thereof is supported by the cartridge upper surface supporting member 60. Accordingly, the different size tape cartridge 20 is held in the tape cartridge holder apparatus 50.

The tape cartridge gripping mechanism 150 operates as follows.

Figure 15C:
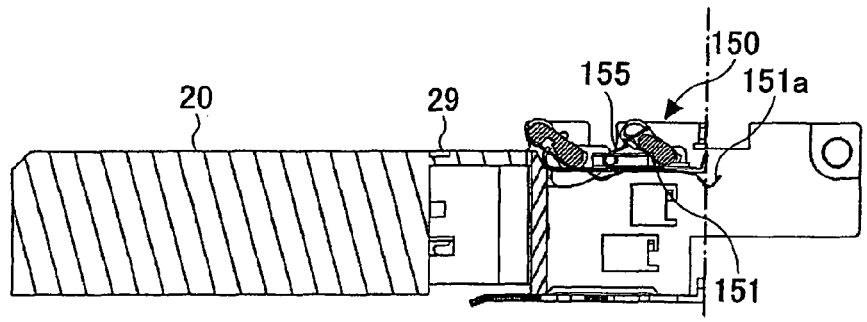
FIG. 15C is a side view of a tape cartridge gripping mechanism and a support mechanism for a cartridge upper surface supporting member when a tape cartridge with a different size is being inserted.
Figure 15D:
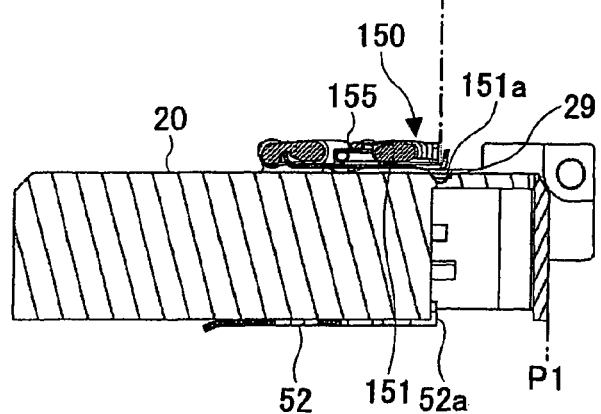
FIG. 15D is a side view of a tape cartridge gripping mechanism and a support mechanism of a cartridge upper surface supporting member when a tape cartridge with a different size is inserted and held.

As shown in FIGS. 14B and 15C, when the cartridge upper surface supporting member 60 is pressed and moved by the different size tape cartridge 20 in the Y1 direction and the cartridge upper surface supporting member 60 swings and moves in a direction substantially between the Y1 and Z1 directions while being supported by the first and second suspension members 71 and 72, the cartridge gripping member 151 is pressed up by the cartridge upper surface supporting member 60, the link member 155 is rotated in the clockwise direction relative to the pin 82b (reverse direction of the rotation direction of the second suspension member 72), and the cartridge gripping member 151 is moved in the Y2 direction on the cartridge upper surface supporting member 60. The convex portion 151a is maintained in the position P2 regarding the Y1-Y2 direction and the position of the convex portion 151a is changed in the Z1 direction.

In the end stage of the different size tape cartridge 20, the different size tape cartridge 20 presses up the convex portion 151a in the Z1 direction and makes the span portion 151b flexible. As shown in FIGS. 1C, 10, 11, and 15D, when the different size tape cartridge 20 is inserted to the end position P1, the convex portion 151a is fitted into the concave portion 29 due to spring force of the span portion 151b and grips the different size tape cartridge 20.

Next, the automatic installation device of a tape cartridge (not shown in the drawings) is operated and the tape cartridge holder apparatus 50 is moved to a predetermined position. Then, as shown in dashed lines in FIG. 11, the different size tape cartridge 20 is moved to a predetermined position along with the tape cartridge holder apparatus 50 and then installed on the tape streamer 30. In this step, the front cover 22 is opened by a front cover opening lever 129.

When the first and second suspension members 71 and 72 are rotated in a pendulum manner, the arm portions 71a and 71b are rotated in synchronization with each other and the arm portions 72a and 72b are also rotated in synchronization with each other. Thus, the cartridge upper surface supporting member 60 is moved while maintaining the horizontal surface and the different size tape cartridge housing space 110 is smoothly formed.

When an ejection command is transmitted, the automatic installation device of a tape cartridge (not shown in the drawings) is operated in the reverse direction of the above-mentioned description, and the different size tape cartridge 20, which has been installed, is ejected along with the tape cartridge holder apparatus 50 to a position shown in FIG. 11. Thereafter, when the operator withdraws a portion of the different size tape cartridge 20 protruding from the tape streamer 30, the different size tape cartridge 20 is taken out of the tape streamer 30.

The tape cartridge gripping mechanism 150 grips the different size tape cartridge 20, so that the different size tape cartridge 20 is moved along with the tape cartridge holder apparatus 50 when the automatic installation device of a tape cartridge is operated.

The present invention is not limited to the specifically disclosed embodiment, and variations and modifications may be made without departing from the scope of the present invention.

What is claimed is:

1. A cartridge holder apparatus into which a plurality of types of cartridges having a lock-receiving portion at the same position on an upper surface thereof and different height are selectively inserted, the cartridge holder apparatus comprising:
   a cartridge supporting member having a lateral plate portion and side plate portions on both sides thereof, the cartridge supporting member supporting a bottom and side surfaces on both sides of an inserted cartridge;
   a cartridge upper surface supporting member disposed between the side plate portions on both sides of the cartridge supporting member, the cartridge upper surface supporting member demarcating a cartridge housing space in cooperation with the cartridge supporting member and being positioned on an upper surface of the inserted cartridge so as to support the upper surface of the cartridge;
   a support mechanism of a cartridge upper surface supporting member for supporting the cartridge upper surface supporting member so as to form a cartridge housing space in accordance with the inserted cartridge; and
   a cartridge gripping mechanism supported by the cartridge upper surface supporting member and the support mechanism of a cartridge upper surface supporting member, the cartridge gripping mechanism gripping the lock-receiving portion of the inserted cartridge by locking,
   wherein the cartridge gripping mechanism is configured to change positions in the vertical direction when the support mechanism of a cartridge upper surface supporting member is operated so as to cause the cartridge upper surface supporting member to change a size of the cartridge housing space while a locking portion for locking the lock-receiving portion of the inserted cartridge maintains a position in a cartridge insertion direction;
   wherein the support mechanism of a cartridge upper surface supporting member is made of a suspension member supported by the cartridge supporting member, the suspension member suspending the cartridge upper surface supporting member and when a cartridge with large dimensions is inserted, the support mechanism of a cartridge upper surface supporting member supports the cartridge with large dimensions so as to move in an obliquely upward direction relative to a cartridge insertion direction by a swing of the cartridge upper surface supporting member due to a rotation of the suspension member; and
   wherein the cartridge gripping mechanism includes:
      a cartridge gripping member supported by the cartridge upper surface supporting member, the cartridge gripping member having a locking portion for locking the lock-receiving portion; and
      a link member whose tip is connected to the cartridge gripping member, the link member being supported by the suspension member and positioned in an obliquely downward direction relative to a direction opposite to the cartridge insertion direction;
      wherein the link member is rotated in a direction reverse to that of the rotation of the suspension member upon the rotation of the suspension member, the cartridge gripping member is moved in a direction opposite to the cartridge insertion direction, and a position of the lock-receiving portion is changed upward while maintaining a position in the cartridge insertion direction.

2. The cartridge holder apparatus according to claim 1, wherein
the cartridge gripping member is made of a leaf spring and disposed beneath the suspension member, and a portion extending from the suspension member in the same direction as the cartridge insertion direction is a span portion having the locking portion at a tip thereof.

3. The cartridge holder apparatus according to claim 1, wherein
the cartridge gripping member is connected to the link member via a connection pin, and
both sides of the connection pin are movably fitted into guide rails formed on an upper surface of cartridge upper surface supporting member.

4. A magnetic recording/reproduction apparatus including a cartridge holder apparatus into which a plurality of types of cartridges having a lock-receiving portion at the same position on an upper surface thereof and different height are selectively inserted, the cartridge holder apparatus comprising:
   a cartridge supporting member having a lateral plate portion and side plate portions on both sides thereof, the cartridge supporting member supporting a bottom and side surfaces on both sides of an inserted cartridge;
   a cartridge upper surface supporting member disposed between the side plate portions on both sides of the cartridge supporting member, the cartridge upper surface supporting member demarcating a cartridge housing space in cooperation with the cartridge supporting member and being positioned on an upper surface of the inserted cartridge so as to support the upper surface of the cartridge;
   a support mechanism of a cartridge upper surface supporting member for supporting the cartridge upper surface supporting member so as to form a cartridge housing space in accordance with the inserted cartridge; and
   a cartridge gripping mechanism supported by the cartridge upper surface supporting member and the support mechanism of a cartridge upper surface supporting member, the cartridge gripping mechanism gripping the lock-receiving portion of the inserted cartridge by locking, wherein
   the cartridge gripping mechanism is configured to change positions in the vertical direction when the support mechanism of a cartridge upper surface supporting member is operated so as to cause the cartridge upper surface supporting member to change a size of the cartridge housing space while a locking portion for locking the lock-receiving portion of the inserted cartridge maintains a position in a cartridge insertion direction;
   wherein the support mechanism of a cartridge upper surface supporting member is made of a suspension member supported by the cartridge supporting member, the suspension member suspending the cartridge upper surface supporting member and when a cartridge with large dimensions is inserted, the support mechanism of a cartridge upper surface supporting member supports the cartridge with large dimensions so as to move in an obliquely upward direction relative to a cartridge insertion direction by a swing of the cartridge upper surface supporting member due to a rotation of the suspension member; and
   wherein the cartridge gripping mechanism includes:
       a cartridge gripping member supported by the cartridge upper surface supporting member, the cartridge gripping member having a locking portion for locking the lock-receiving portion; and
       a link member whose tip is connected to the cartridge gripping member, the link member being supported by the suspension member and positioned in an obliquely downward direction relative to a direction opposite to the cartridge insertion direction;
       wherein the link member is rotated in a direction reverse to that of the rotation of the suspension member upon the rotation of the suspension member, the cartridge gripping member is moved in a direction opposite to the cartridge insertion direction, and a position of the lock-receiving portion is changed upward while maintaining a position in the cartridge insertion direction.

5. The magnetic recording/reproduction apparatus according to claim 4, wherein
the cartridge gripping member is made of a leaf spring and disposed beneath the suspension member, and a portion extending from the suspension member in the same direction as the cartridge insertion direction is a span portion having the locking portion at a tip thereof.

6. The magnetic recording/reproduction apparatus according to claim 4, wherein
the cartridge gripping member is connected to the link member via a connection pin, and
both sides of the connection pin are movably fitted into guide rails formed on an upper surface of cartridge upper surface supporting member.

7. A cartridge holder apparatus comprising:
   a cartridge supporting member configured to support a bottom surface of an inserted cartridge;
   a cartridge upper surface supporting member configured to support an upper surface of said inserted cartridge, said cartridge upper surface supporting member being moveable relative to said cartridge supporting member;
   a support mechanism configured to support said cartridge upper surface supporting member and including a suspension member rotatably supported relative to said cartridge upper surface supporting member, said cartridge upper surface supporting member configured to move relative to said cartridge supporting member in response to a rotation of said suspension member in a first direction; and
   a cartridge gripping mechanism including:
       a link member supported by said suspension member, said link member configured to rotate in a second direction opposite to said first direction upon a rotation of said suspension member in said first direction; and
       a cartridge gripping member configured to grip said inserted cartridge.

* * * * *